(12) United States Patent
Vargas et al.

(10) Patent No.: US 10,329,919 B2
(45) Date of Patent: Jun. 25, 2019

(54) AIRFOIL STRUCTURE AND METHOD OF MANUFACTURE

(71) Applicant: UNITED TECHNOLOGIES CORPORATION, Farmington, CT (US)

(72) Inventors: Chris Vargas, West Hartford, CT (US); Steven D. Jenkel, Springvale, CT (US); Daniel A. Bales, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 188 days.

(21) Appl. No.: 15/482,540

(22) Filed: Apr. 7, 2017

(65) Prior Publication Data

US 2018/0291746 A1 Oct. 11, 2018

(51) Int. Cl.
| | | |
|---|---|---|
| *F01D 5/00* | (2006.01) | |
| *F01D 5/14* | (2006.01) | |
| *B21J 15/02* | (2006.01) | |
| *B23K 20/12* | (2006.01) | |
| *B23K 20/233* | (2006.01) | |
| *B23K 1/00* | (2006.01) | |
| *B23K 101/00* | (2006.01) | |
| *B23K 103/10* | (2006.01) | |
| *B23K 103/14* | (2006.01) | |
| *B23K 103/18* | (2006.01) | |

(52) U.S. Cl.
CPC ............ *F01D 5/147* (2013.01); *B21J 15/027* (2013.01); *B23K 1/0018* (2013.01); *B23K 20/127* (2013.01); *B23K 20/1295* (2013.01); *B23K 20/233* (2013.01); *B23K 2101/001* (2018.08); *B23K 2103/10* (2018.08); *B23K 2103/14* (2018.08); *B23K 2103/26* (2018.08); *F05D 2220/36* (2013.01); *F05D 2230/237* (2013.01); *F05D 2230/239* (2013.01); *Y02T 50/671* (2013.01); *Y02T 50/673* (2013.01)

(58) Field of Classification Search
CPC . F01D 5/147; B23K 2101/001; B23K 1/0018; B23K 20/127; B23K 20/1295; B21J 15/027; F05D 2230/237
See application file for complete search history.

(56) References Cited

U.S. PATENT DOCUMENTS 3,096,826 A * 7/1963 Amer ..................... B64C 27/18
                                                          244/124
3,402,914 A    9/1968 Kump et al.
(Continued)

FOREIGN PATENT DOCUMENTS

JP    2003266184      9/2003
JP    2003266184 A  *  9/2003    ......... B23K 20/1225

OTHER PUBLICATIONS

European Patent Office, European Search Report dated Sep. 7, 2018 in Application No. 18161954.5-1016.

*Primary Examiner* — Hieu T Vo
*Assistant Examiner* — Sherman D Manley
(74) *Attorney, Agent, or Firm* — Snell & Wilmer, L.L.P.

(57) ABSTRACT

An airfoil may include an airfoil body, a cover, and a stud. The cover may be disposed on at least one of a suction side and a pressure side of the airfoil body and the stud may extend through the cover and into the airfoil body and the stud may be is joined to the airfoil body and the cover by a friction weld.

20 Claims, 6 Drawing Sheets

(56) References Cited

U.S. PATENT DOCUMENTS

| | | | |
|---|---|---|---|
| 5,248,241 A * | 9/1993 | Ortolano | B23P 15/02 |
| | | | 416/193 R |
| 5,876,183 A | 3/1999 | Furlan et al. | |
| 7,189,064 B2 | 3/2007 | Helder et al. | |
| 9,221,120 B2 | 12/2015 | Schwarz et al. | |
| 9,233,414 B2 | 1/2016 | Watson et al. | |
| 2004/0232209 A1 * | 11/2004 | Stol | B21J 15/027 |
| | | | 228/112.1 |
| 2005/0254955 A1 * | 11/2005 | Helder | B23K 20/122 |
| | | | 416/233 |
| 2009/0280252 A1 * | 11/2009 | Armstrong | B05D 5/00 |
| | | | 427/299 |
| 2010/0074759 A1 * | 3/2010 | Dierksmeier | F01D 5/147 |
| | | | 416/241 B |
| 2012/0201653 A1 | 8/2012 | Moga et al. | |
| 2013/0167555 A1 * | 7/2013 | Schwarz | F01D 5/147 |
| | | | 60/805 |
| 2014/0241897 A1 | 8/2014 | Bales et al. | |
| 2015/0226068 A1 | 8/2015 | Maurizio | |
| 2016/0305443 A1 | 10/2016 | Schwarz et al. | |

* cited by examiner

AIRFOIL STRUCTURE AND METHOD OF MANUFACTURE

FIELD

The present disclosure relates to airfoils, and more specifically, to structure and methods of attaching a cover to an airfoil.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Some airfoils have covers that are attached to a pressure side or a suction side of the airfoil. For example, an airfoil body may be manufactured to have various recesses or cavities, which may be for weight reduction, balance, cooling, etc. A cover may be attached to the airfoil body to extend over the recesses or cavities. However, conventional methods of manufacturing airfoils with covers have various shortcomings.

SUMMARY

In various embodiments, the present disclosure provides an airfoil. The airfoil may include an airfoil body, a cover disposed on at least one of a suction side and a pressure side of the airfoil body, and a stud extending through the cover and into the airfoil body. The stud may be joined to the airfoil body and the cover by a friction weld.

In various embodiments, the stud is a first stud and the airfoil further comprises a second stud extending through the cover an into the airfoil body. In various embodiments, the stud extends completely through the cover and completely through the airfoil body from the suction side to the pressure side of the airfoil body. In various embodiments, the airfoil body defines a recess formed in at least one of the suction side and the pressure side of the airfoil body, wherein the cover extends across an opening of the recess. The airfoil body may include a rib that extends through the recess and the stud may extend into the rib of the airfoil body.

In various embodiments, the airfoil further includes a braze filler material joining the cover to the airfoil body. In various embodiments, the airfoil further includes an anti-corrosion compound disposed in a seam between the cover and the airfoil body. In various embodiments, an anti-erosion compound disposed in a seam between the cover and the airfoil body.

Also disclosed herein, according to various embodiments, is a method of manufacturing an airfoil. The method may include forming a first bore in an airfoil body, the first bore having a first diameter. The method may include forming a second bore in a cover, the second bore having a second diameter. The method may still further include positioning the cover adjacent the airfoil body so that a first bore axis of the first bore is collinear with a second bore axis of the second bore. The method may also include rotatably forcing a stud through the second bore and the first bore to friction weld the cover to the stud and the airfoil body to the stud, wherein before rotatably forcing the stud, the stud has a third diameter that is equal to or greater than the first diameter and the second diameter.

In various embodiments, the method includes forming a recess in at least one of a pressure side and a suction side of the airfoil body. Positioning the cover adjacent the airfoil body may include extending the cover across an opening of the recess. In various embodiments, forming the recess includes forming a rib that extends through the recess such that the first bore is formed in the rib. The first bore may be a pass-through bore that extends completely through the airfoil body from a suction side to a pressure side of the airfoil body. In various embodiments, the method may further include applying a braze filler material between respective mating surfaces of the cover and the airfoil body. The method may further include heating the braze filler material to seal braze the cover to the airfoil body.

In various embodiments, the method further includes applying a protective filler material in a seam between the cover and the airfoil body. In various embodiments, applying the protective filler material is performed after heating the braze filler material. In various embodiments, applying the protective filler material includes various sub-steps, including applying an anti-corrosion compound in the seam, after applying the anti-corrosion compound in the seam, curing the anti-corrosion compound, and, after curing the anti-corrosion compound, applying an anti-erosion compound over the anti-corrosion compound.

Also disclosed herein, according to various embodiments, is a gas turbine engine that includes a fan section having a plurality of fan blades. Each fan blade of the plurality of fan blades may include a cover that is joined to an airfoil body by one or more friction stud welds. In various embodiments, the cover is exclusively structurally joined to the airfoil body via the one or more friction stud welds.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
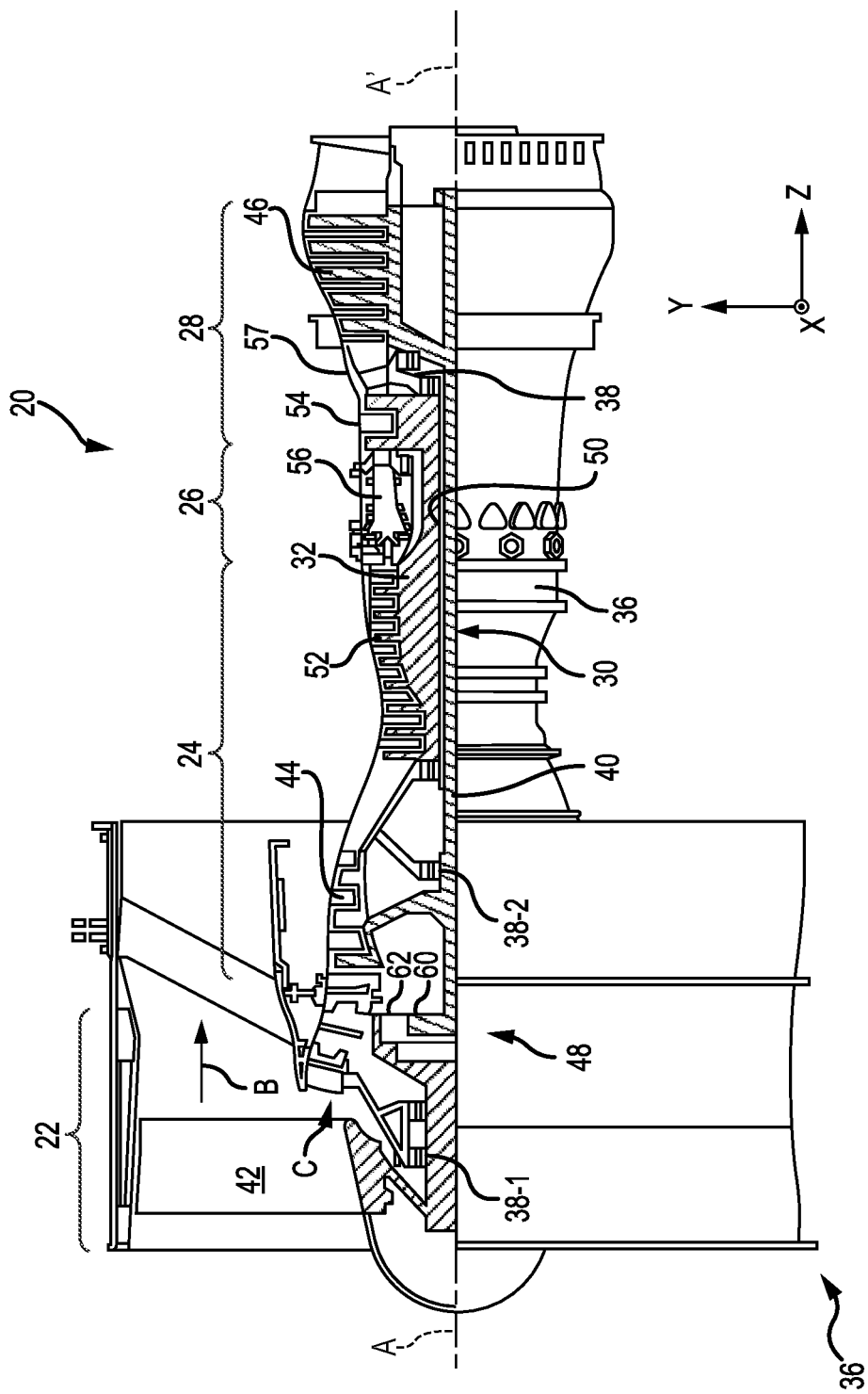
FIG. 1 illustrates a cross-sectional view of a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
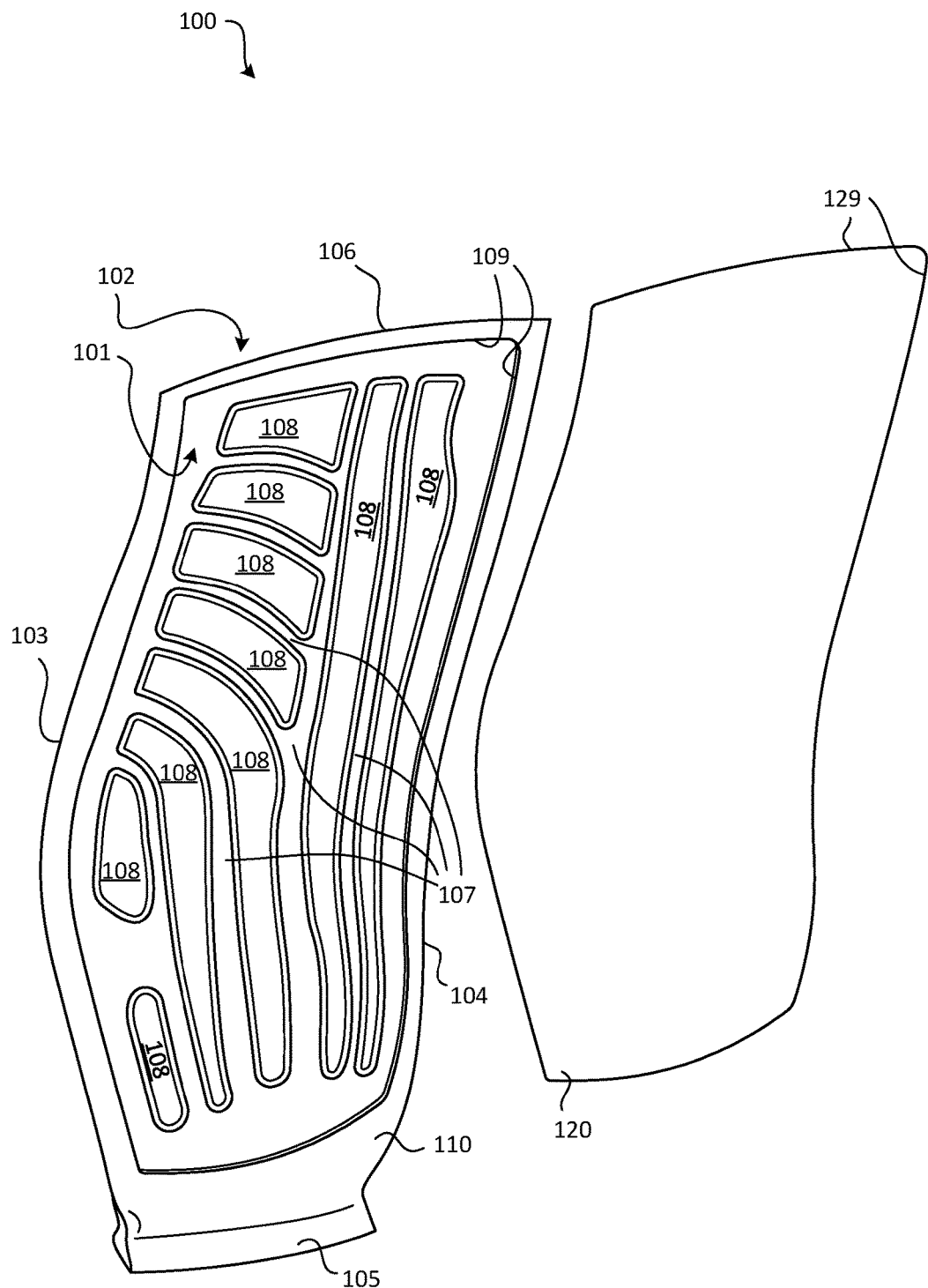
FIG. 2 illustrates a partially exploded perspective view of an airfoil body and a cover, in accordance with various embodiments.

In various embodiments, and with reference to FIG. 2, a partially exploded view of an airfoil 100 having an airfoil body 110 and a cover 120 is provided. The cover 120 is shown removed a distance from the airfoil body 110 because, according to various embodiments, the present disclosure provides structure and methods for attaching the cover 120 to the airfoil body 110. Conventional techniques for attaching a cover to an airfoil include stir welding multi-piece covers to an airfoil body and brazing a cover to the an airfoil body. As described in greater detail below, and according to various embodiments, the present disclosure provides an airfoil 100 having one or more studs 130 (see, e.g., FIG. 3) that extend through a cover 120 and extend into an airfoil body 110 for attaching the cover 120 to the airfoil body 110. Generally, the stud 130 is joined to the airfoil body 110 and the cover 120 by a friction weld. As described in greater detail below, by utilizing studs 130 to friction weld the cover 120 to the airfoil body 110, the airfoil 100 may have improved structural properties. Moreover, the airfoil may be subjected to lower temperatures during manufacture than would otherwise be possible using conventional techniques.

In various embodiments, and with continued reference to FIG. 2, the airfoil body 110 has a pressure side 101, a suction side 102, a leading edge 103, and a trailing edge 104. The airfoil 100 also includes a base 105 and a tip 106 (the base 105 may also be referred to as a "root" or a "blade root"). The airfoil 100 may be, for example, a fan blade of the fan section 22 and the fan section 22 may include a plurality of fan blades having the features disclosed herein. It will be noted that while numerous details are included herein pertaining to airfoils for gas turbine engines, the airfoil 100 disclosed herein may be utilized in a variety of industries/applications and may have a variety of sizes, shapes, and geometries. Accordingly, the airfoil 100 of the present disclosure is not limited to gas turbine engines and is not limited to the specific geometry, size, and shape shown in the figures.

The airfoil body 110 may define one or more recesses 108 or cavities that are formed in the suction side 102 and/or the pressure side 101 of the airfoil 100. Therefore, in various embodiments, the airfoil 100 is referred to as "hollow" because it has one or more recesses, cavities, or chambers. These recesses 108 can reduce a weight of the airfoil and can enable the airfoil 100 to be tuned, for example, to improve the rotational dynamics of the airfoil 100. In various embodiments, various inserts or filler material may be positioned within the recesses 108 of the airfoil, such as a foam material. In various embodiments, the airfoil body 110 includes one or more ribs 107 extending through the recess to divide the recess into pockets or subsections of the recess (said differently, the ribs 107 may be portions of the airfoil body 110 that extend between separate recesses 108).

The cover 120, according to various embodiments, is disposed on at least one of the suction side 102 and the pressure side 101 and extends across or over the recesses 108. Said differently, the cover 120 may be positioned so as to extend across an opening of the recess(es) 108. In various embodiments, the airfoil body 110 has an indentation 109 and the cover 120 may be designed to fit within the indentation 109. That is, an outer periphery 129 of the cover 120 may match the shape of the indentation 109 and thus the cover 120 may be configured to be seated within the indentation 109 to improve the aerodynamics of the airfoil 100 (i.e., avoiding abrupt aerodynamic steps or protrusions that would potentially negatively impact the operation of the airfoil 100).

Figure 3:
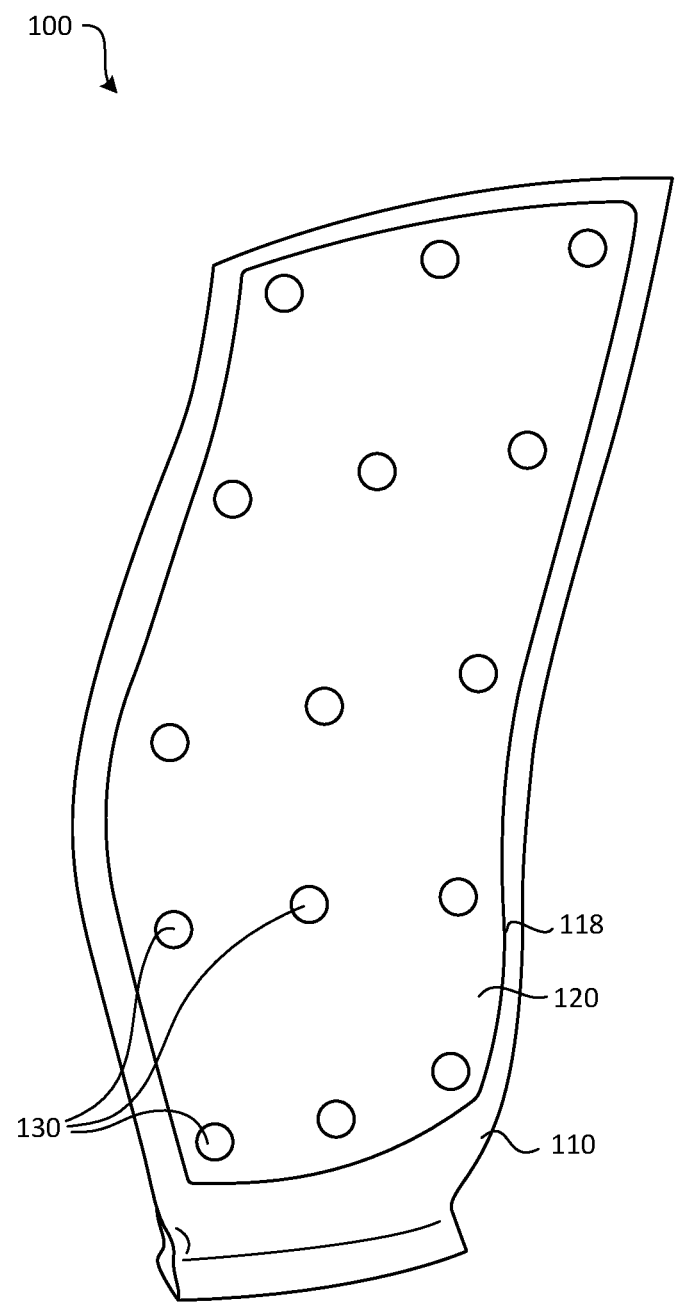
FIG. 3 illustrates a perspective view of an airfoil having a stud holding a cover and an airfoil body via friction weld, in accordance with various embodiments.

In various embodiments, and with reference to FIG. 3, the cover 120 may be attached to the airfoil body 110 using one or more studs 130. That is, for example, a first stud and a second stud (e.g., a plurality of studs 130) may extend through the cover 120 and into the airfoil body 110 to retain the cover 120 engaged with the airfoil body 110 by a friction weld. Said differently, a stud 130 may be joined to the airfoil body 110 by a friction weld and the stud 130 may also be joined to the cover 120 by a friction weld, thereby attaching the cover 120 to the airfoil body 110 of the airfoil 100.

In various embodiments, and with reference to FIGS. 4A, 4B, 4C, and 5, a method 590 of manufacturing the airfoil 100 is provided. Generally, the method 590 includes forming a first bore 112 in the airfoil body 110 at step 592, according to various embodiments. The method 590 may further include forming a second bore 122 in the cover 120 at step 594. Still further, the method 590 may include positioning the cover 120 adjacent the airfoil body 110 at step 596. Step 596, according to various embodiments, includes positioning the cover 120 so that a first bore axis of the first bore 112 and a second bore axis of the second bore 122 are collinear (the collinearity of the first bore axis and the second bore axis is shown using a single axis, 115, with reference to FIG. 4A). Still further, the method 590 may include rotatably forcing a stud 130 into the second bore 122 and into the first bore 112 at step 598. In various embodiments, step 598 of rotatably forcing the stud 130 into the second bore 122 and the first bore 112 friction welds the cover 120 to the airfoil body 110 via the stud 130. Said differently, step 598 may include friction welding the cover 120 to the stud 130 and friction welding the airfoil body 110 to the stud 130, as described in greater detail below.

Friction welding, according to various embodiments, is a solid-state welding process that produces heat via mechanical friction between, for example, the stud 130 and the airfoil body 110 and between the stud 130 and the cover 120. Accordingly, joining the airfoil body 110, the cover 120, and the stud 130 together via step 598 of the method 590 includes creating relative rotation between the stud 130 and the combination of the airfoil body 110 and the cover 120. Said differently, step 598 of rotatably forcing the stud 130 into bores/holes formed in the cover 120 and the airfoil body 110 may be achieved by rotating the stud 130 while the airfoil body 110 and the cover 120 remain stationary, or vice versa. In various embodiments, both the stud 130 and the combination of the airfoil body 110 and the cover 120 may be rotating in opposing directions as the stud 130 is inserted through the cover 120 and into the airfoil body 110.

Figure 4A:
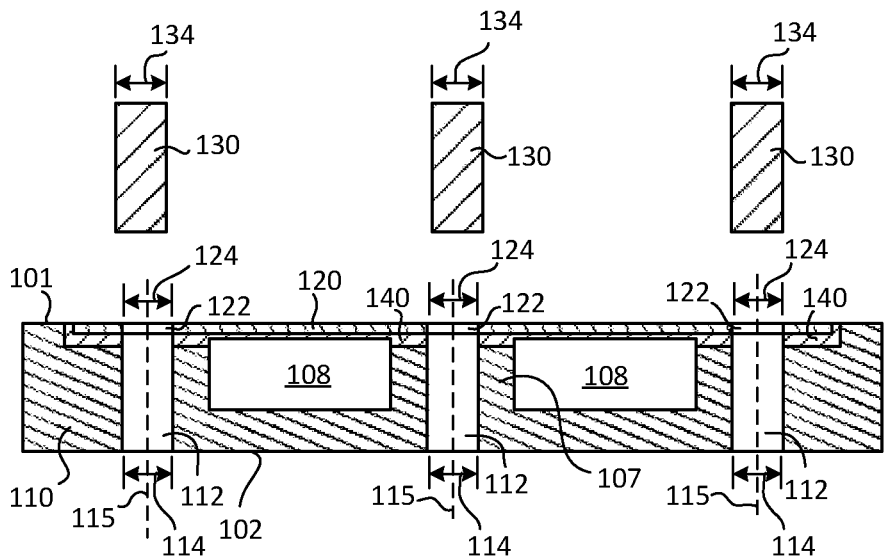
FIGS. 4A, 4B, 4C, and 4D illustrate cross-sectional views of an airfoil, in accordance with various embodiments.
Figure 4B:
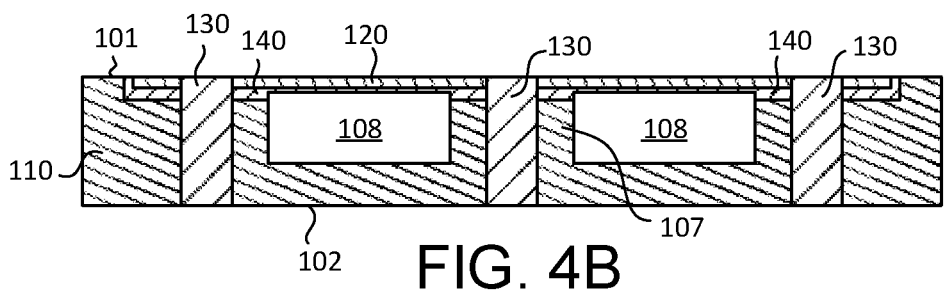
Figure 4C:
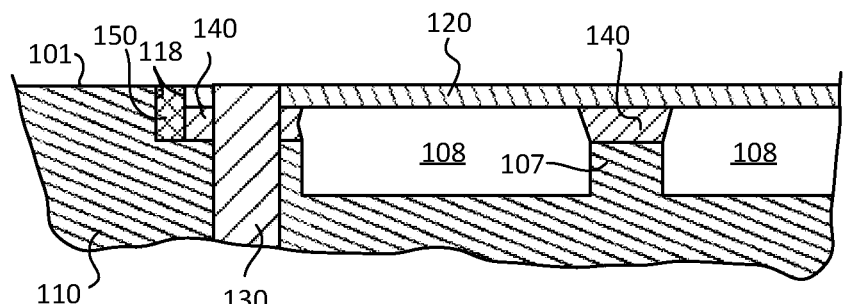
Figure 4D:
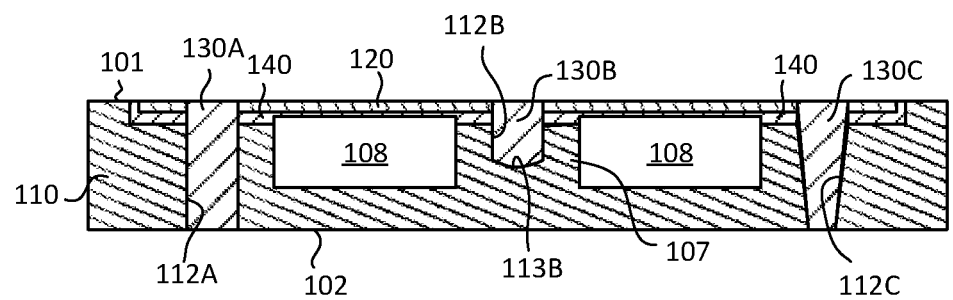
Figure 5:
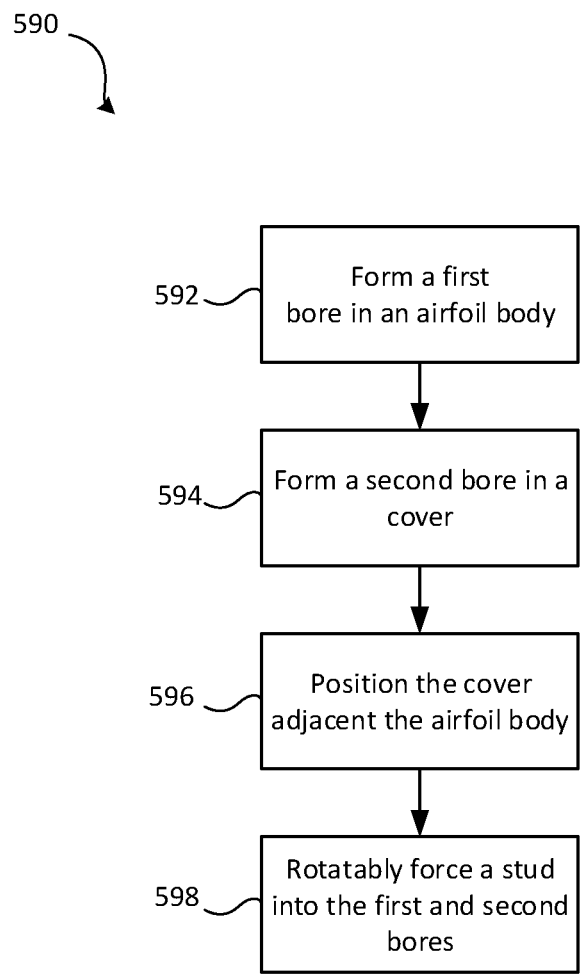
FIG. 5 is a schematic flow chart diagram of a method of manufacturing an airfoil, in accordance with various embodiments.

In various embodiments, and with momentary reference to FIG. 4D, one or more of the bores 112A formed in the airfoil body 110 is cylindrical and the corresponding stud 130A is also cylindrical. In various embodiments, and with continued reference to FIG. 4D, one or more of the bores 112B may be a partial bore that does not extend completely through the airfoil body 110. In various embodiments, the partial bore 112B may have a closed end 113B that is rounded (e.g., spherical, having a radius of curvature) and the corresponding stud 130B may have a rounded tip that corresponds with the rounded closed end 113B. The rounded, curved configuration of the stud 130B can reduce stress concentrations that may arise from sharp or abrupt edges. In various embodiments, one or more of the bores 112C may be tapered and the corresponding stud 130C may also be tapered. A tapered stud 130C may be easier to insert and easier to weld, and there may be an increased surface weld area with the tapered bore 112C and tapered stud 130C configuration. Accordingly, the bores 112 and the studs 130 may have various shapes and configurations.

In various embodiments, and with reference to FIG. 4A, in order to create the friction between the stud 130 and the combination of the airfoil body 110 and cover 120, the first bore 112 has a first diameter 114 and the second bore 122 has a second diameter 124 that are both equal to or smaller than a third diameter 134 of the stud 130 before the stud 130 is rotatably inserted (step 598) through the aligned bores 112, 122. In other words, the third diameter 134 of the stud 130 is the diameter of the stud 130 pre-insertion (i.e., before step 598), and the third diameter 134 is equal to or greater than the first diameter 114 and the second diameter 124, according to various embodiments. In various embodiments, the first diameter 114 is substantially the same as the second diameter 124. As mentioned above and with momentary reference to FIG. 4D, the bore may be a tapered bore 112C and the stud may be a tapered stud 130C. Accordingly, the diameter comparison (i.e., the comparison of the diameter of the bore with the pre-insertion diameter of the stud) is also applicable to tapered bores and tapered studs. That is, the inner diameter profile dimensions of the tapered bore 112C, as a function of location along the bore axis, are less than the pre-inserted, outer diameter profile dimensions of the tapered stud 130C as a function of location along the bore axis.

In various embodiments, the one or more studs 130 may be distributed across the pressure side 101 or the suction side 102 of the airfoil 100 (see, for example, FIG. 3). In various embodiments, the stud(s) 130 extend completely through the cover 120 and completely through the airfoil body 110 (e.g., the first bore 112 may be a pass-through bore). In other words, the stud 130 may extend from the pressure side 101 of the airfoil 100 to the suction side 102 of the airfoil. In various embodiments, the stud 130 extends only partially through the airfoil body 110, as mentioned above with reference to FIG. 4D. In various embodiments, the stud 130 extends into/through the ribs 107 of the airfoil body 110 and/or edge portions of the airfoil body 110. In various embodiments, the one or more ribs 107 of the airfoil body 110 may be designed to have larger dimensions (e.g., at least larger than the first diameter 114 of the first bore 112) at the locations where the stud 130 is configured to be rotatably inserted, thereby enabling the stud 130 to adequately friction weld with the airfoil body 110.

In various embodiments, the exclusive structural connection between the airfoil body 110 and the cover 120 is via the friction weld of the stud(s) 130. In other words, while the method 590 of manufacturing may include additional joining steps, such as applying a braze filler material 140 between respective mating surfaces of the cover 120 and the airfoil body 110 and heating the braze filler material to seal braze the cover 120 to the airfoil body 110, these additional joining techniques may not substantially contribute to the overall structural strength of the airfoil 100 (e.g., the friction weld of the stud(s) 130 exclusively structurally holds the airfoil 100 together, but the braze filler material 140 may minimize high residual stress concentrations that would otherwise occur between the respective mating surfaces of the cover 120 and the ribs 107 and peripheral recesses of the airfoil body 110). Said differently, structural loads on the airfoil 100 may be transferred between the cover 120 and the airfoil body 110 exclusively via the stud(s) 130, according to various embodiments. In various embodiments, the brazing process may be performed under vacuum. In various embodiments, the brazing process is performed in an inert gas environment.

In various embodiments, and with reference to FIG. 4C, the method 590 may further include applying a protective filler material 150 in a seam 118 (also shown in FIG. 3) between the cover 120 and the airfoil body 110 (e.g., between the outer periphery 129 of the cover 120 and side walls of the indentation 119 described above with reference to FIG. 2). Applying the protective filler material may be performed after friction welding (e.g., step 598) and after the optional step of applying and heating the braze filler material 140. In various embodiments, the protective filler material 150 includes an anti-corrosion compound, an anti-erosion compound, or a combination of the two. For example, the anti-erosion compound may include a corrosion inhibiting paint, such as a compound including zinc molybdate, and the anti-erosion compound may include a polyurethane compound. In various embodiments, applying the protective filler material 150 may include applying an anti-corrosion compound in the seam 118, subsequently curing the anti-corrosion compound, and then subsequently applying an anti-corrosion compound over the cured anti-corrosion compound.

In various embodiments, the airfoil body 110, the cover 120, and the stud(s) 130 may be formed of various materials and by various manufacturing processes. For example, the airfoil body 110, with its defined recesses 108, may be cast, machined from wrought product, or produced via additive manufacturing. The bores 112, 122 may be formed during casting or may be subsequently formed via drilling, milling, or other suitable techniques. In various embodiments, the airfoil body 110, the cover 120, and the stud 130 may be made from similar materials. For example, the airfoil body 110, the cover 120, and the stud 130 may be made from the same metal or at least from alloys of the same metal, according to various embodiments. The airfoil body 110, the cover 120, and the stud 130 may be made from aluminum, aluminum alloys, titanium, titanium alloys, or other suitable materials.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil comprising:
    an airfoil body;
    a cover disposed on at least one of a suction side and a pressure side of the airfoil body, wherein a seam is defined between the airfoil body and the cover;
    a stud extending through the cover and into the airfoil body, wherein the stud is joined to the airfoil body and the cover by a friction weld; and
    a protective filler material disposed in the seam between the cover and the airfoil body.

2. The airfoil of claim 1, wherein the stud is a first stud and the airfoil further comprises a second stud extending through the cover and into the airfoil body.

3. The airfoil of claim 1, wherein the stud extends completely through the cover and completely through the airfoil body from the suction side to the pressure side of the airfoil body.

4. The airfoil of claim 1, wherein the airfoil body defines a recess formed in at least one of the suction side and the pressure side of the airfoil body, wherein the cover extends across an opening of the recess.

5. The airfoil of claim 1, wherein the airfoil further comprises a braze filler material joining the cover to the airfoil body.

6. The airfoil of claim 1, wherein the protective filler material comprises an anti-corrosion compound.

7. The airfoil of claim 1, wherein the stud is a tapered stud.

8. A method of manufacturing an airfoil, the method comprising:
    forming a first bore in an airfoil body, the first bore having a first diameter;
    forming a second bore in a cover, the second bore having a second diameter;
    positioning the cover adjacent the airfoil body so that a first bore axis of the first bore is collinear with a second bore axis of the second bore; and
    rotatably forcing a stud through the second bore and the first bore to friction weld the cover to the stud and the airfoil body to the stud, wherein before rotatably forcing the stud, the stud has a third diameter that is equal to or greater than the first diameter and the second diameter.

9. The method of claim 8, further comprising forming a recess in at least one of a pressure side and a suction side of the airfoil body.

10. The method of claim 9, wherein positioning the cover adjacent the airfoil body comprises extending the cover across an opening of the recess.

11. The method of claim 10, forming the recess comprises forming a rib that extends through the recess, wherein the first bore is formed in the rib.

12. The method of claim 8, wherein the first bore is a pass-through bore that extends completely through the airfoil body from a suction side to a pressure side of the airfoil body.

13. The method of claim 8, further comprising applying a braze filler material between respective mating surfaces of the cover and the airfoil body.

14. The method of claim 13, further comprising heating the braze filler material to seal braze the cover to the airfoil body.

15. The method of claim 14, further comprising applying a protective filler material in a seam between the cover and the airfoil body.

16. The method of claim 15, wherein applying the protective filler material is performed after heating the braze filler material.

17. The method of claim 16, wherein applying the protective filler material comprises:
    applying an anti-corrosion compound in the seam;
    after applying the anti-corrosion compound in the seam, curing the anti-corrosion compound; and
    after curing the anti-corrosion compound, applying an anti-erosion compound over the anti-corrosion compound.

18. The method of claim 8, wherein the first diameter is substantially the same as the second diameter.

19. A gas turbine engine comprising:
    a fan section comprising a plurality of fan blades;
    wherein each fan blade of the plurality of fan blades comprises a cover that is joined to an airfoil body by at least one friction stud weld, wherein the at least one friction stud weld comprises a first friction stud weld that is tapered.

20. The gas turbine engine of claim 19, wherein the cover is exclusively structurally joined to the airfoil body via the at least one friction stud welds.

* * * * *